(12) United States Patent
OuYang et al.

(10) Patent No.: US 6,377,758 B1
(45) Date of Patent: Apr. 23, 2002

(54) METHOD AND SYSTEM FOR ANALYZING IMAGING PROBLEMS

(75) Inventors: William M. OuYang, Rochester; Jack Whipple, North Rose, both of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/707,052

(22) Filed: Nov. 6, 2000

(51) Int. Cl.[7] .............................................. G03G 15/00
(52) U.S. Cl. ........................................... 399/15; 399/31
(58) Field of Search .............................. 399/15, 26, 31, 399/160; 358/406; 382/112

(56) References Cited

U.S. PATENT DOCUMENTS 5,155,529 A * 10/1992 Rushing ...................... 399/31
5,173,733 A * 12/1992 Green ......................... 399/26
6,275,600 B1 * 8/2001 Banker et al. ............... 382/112

FOREIGN PATENT DOCUMENTS

JP          8-152415     *   6/1996

* cited by examiner

Primary Examiner—Joan Pendegrass
(74) Attorney, Agent, or Firm—Lahive & Cockfield, LLP

(57) ABSTRACT

A system is disclosed for detecting defects in a printed image to analyze imaging problems in an image reproducing apparatus. The printed image is scanned by the scanner and the printed image data obtained in the scanner is fed back and compared with original image data. The system finds defects in the printed image in a closed loop manner. The printed image data is automatically feeds back to a control unit so that a processor compares the printed image data with the original image data to detect defects in the intermediate imaging member. The system determine whether the intermediate imaging member needs to be replaced on the basis of the comparison.

17 Claims, 10 Drawing Sheets

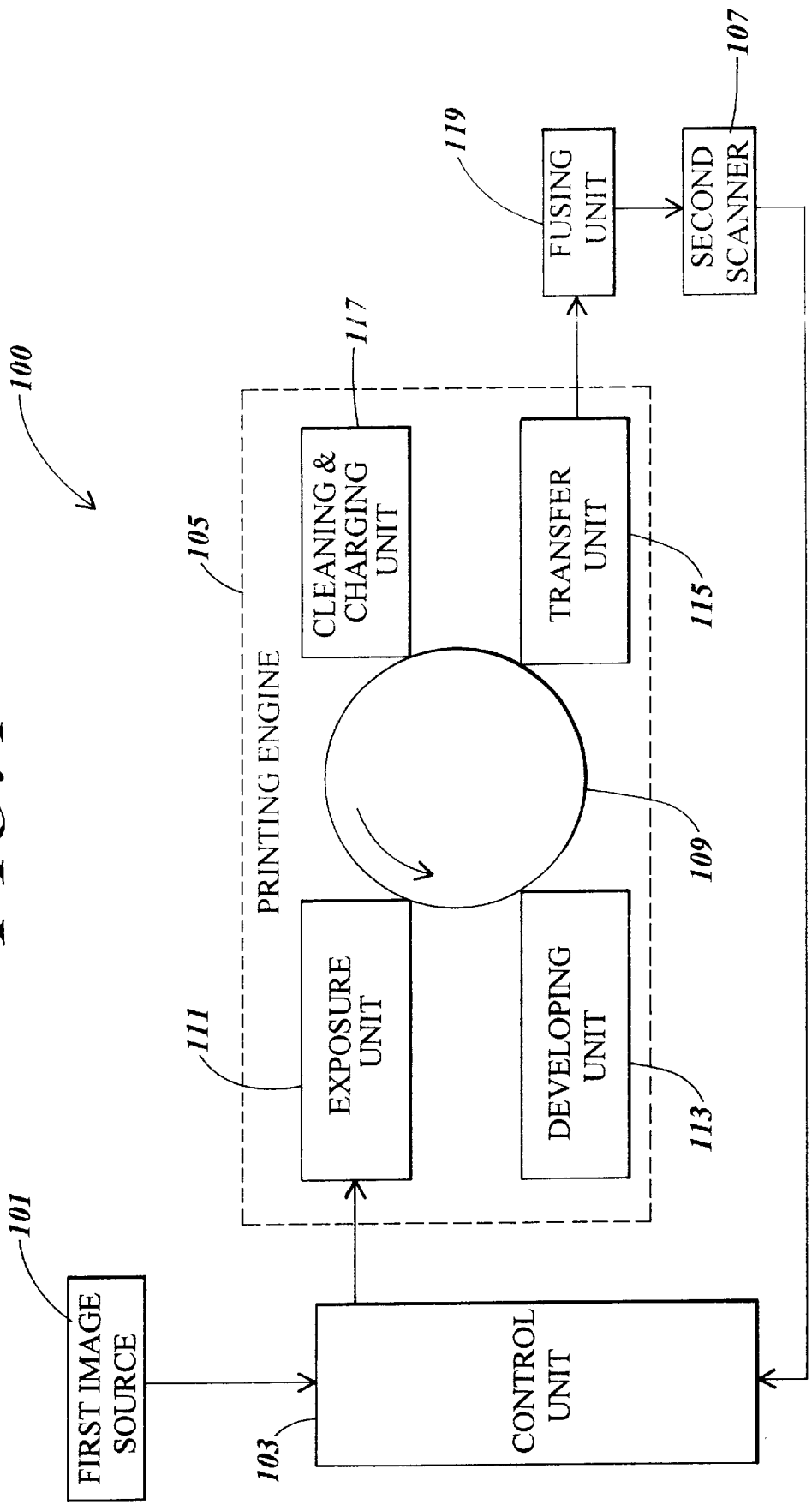

METHOD AND SYSTEM FOR ANALYZING IMAGING PROBLEMS

TECHNICAL FIELD

The present invention relates generally to an image reproducing apparatus and more particularly to methods and systems for analyzing imaging problems with the image reproducing apparatus.

BACKGROUND OF THE INVENTION

Electrophotography (or Xerography) is the most common photocopying method. Electrophotography techniques are widely employed in commerce and industry in such devices as electrostatic dry photocopiers, computer laser printers and plain-paper facsimile machines.

In an electrophotographic image reproducing apparatus, an image is reproduced on a printing substrate by means of attractive forces of electric charges. The electric charges are uniformly spread over an intermediate imaging member. The electric charges that correspond to the image remains on the intermediate imaging member and the other charges are removed from the intermediate imaging member by a lay, such as a laser beam. A plastic powder called toner is introduced to the remaining electric charges to form a toner image on the intermediate imaging member. A printing substrate, such as a paper sheet, is then passed through the intermediate imaging member so that the toner image is transferred from the intermediate imaging member to the printing substrate. The toner image is affixed to the printing substrate with pressure and heat.

The intermediate imaging member in an image reproducing apparatus can greatly affect print quality of a printed image. In particular, the intermediate imaging member may be subject to wear over its lifetime, which can deleteriously affect printed image quality. Printed images produced by an image reproducing apparatus are sometimes analyzed to determine whether the intermediate imaging member needs to be replaced. This analysis is usually performed by technical representatives in the field.

The conventional method for analyzing an intermediate imaging member operates in an open loop manner. In the conventional analysis, a couple of standard charts are printed and the printed charts are independently analyzed based on a reference table. Thus, the conventional open loop method takes a great deal of time in analyzing the intermediate imaging member.

The conventional analysis is performed manually by technical representatives in the field. The manual analysis is prone to error and cannot accurately determine when it is appropriate to replace the intermediate imaging member.

SUMMARY OF THE INVENTION

The present invention provides methods and systems for analyzing imaging problems including but not limited to detecting defects of an intermediate imaging member in an image reproducing apparatus, such as a printer or copier. In one applications of the present invention, a printed image is compared with an original image to detect problems, such as defects on the intermediate imaging member. The comparison data is analyzed to determine whether the intermediate imaging member is appropriate for reproducing an image.

An object of the present invention is to analyze an intermediate imaging member in a closed loop manner. A scanner is provided for scanning a printed image produced by the image reproducing apparatus and provides a closed feedback loop with a processor that originally generates data for printing an image. The printed image scanned by the scanner is fed to the processor to be compared with the original image.

Another object of the present invention is to provide a computerized analysis of an intermediate imaging member in an image reproducing apparatus. The printed image scanned by the scanner is automatically fed back to a processor and compared with an original image. The processor provides a real time analysis of the intermediate imaging member based on the comparison.

In accordance with one aspect of the present invention, first image data for printing an image is generated in the image reproducing apparatus. The image is formed on a predetermined area of an intermediate imaging member and transferred to a printing substrate. The printed image is scanned to obtain second image data. The second image data is compared with the first image data to detect imaging problems.

In accordance with another aspect of the present invention, a method for concurrently analyzing all imaging areas of an intermediate imaging member in an image reproducing apparatus is provided. Half-tone test patches with different half-tone values are generated. The test patches are received on different areas of the intermediate imaging member and transferred to printing substrates. The half-tone test patches reproduced in the printing substrates are scanned to obtain half-tone values of the printed half-tone test patches. The half-tone values of the printed half-tone test patches are compared with the original half-tone values to detect defects in each area of the intermediate imaging member. Finally, it is determined whether the intermediate imaging member needs to be replaced.

In accordance with further aspect of the present invention, a system for analyzing an image reproducing apparatus is provided. The system includes a processor for generating first image data for printing an image. A printing engine forms the image on a predetermined area of the intermediate imaging member and transfers the image to a printing substrate. A scanner scans the printed image to obtain second image data. The processor compares the second image data with the first image data to find defective pixels in the printed image.

BRIEF DESCRIPTION OF THE DRAWINGS

An illustrative embodiment of the present invention will be described below relative to the following drawings.

FIG. 1 is an example of a block diagram of an image reproducing apparatus in which the illustrative embodiment of the present invention may be practiced.

DETAILED DESCRIPTION OF THE INVENTION

Figure 2A:
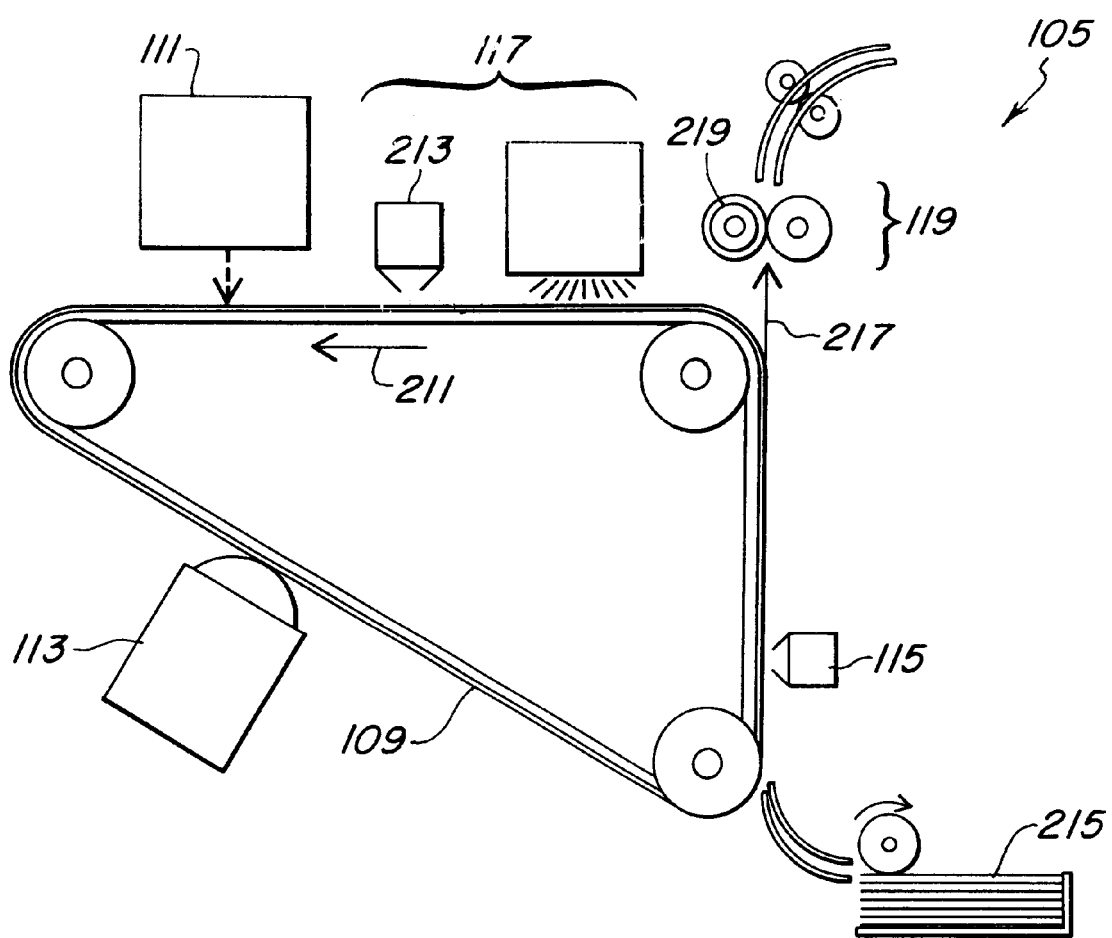
FIG. 2A is an example of a print engine that employs a flexible photoreceptor belt as an intermediate imaging member.

The illustrative embodiment of the present invention concerns the analysis of imaging performed by an image reproducing apparatus, such as a printer or copier. The illustrative embodiment finds imaging problems and finds defects in the intermediate imaging member by comparing a printed image produced by the apparatus with an original image. In particular, the printed image is fed to a processor in a closed loop manner to be compared with the original image. For the purpose of building a closed feedback loop, the embodiment includes a scanner for scanning the printed image. The scanner is connected to the processor so that the printed image scanned by the scanner is fed to the processor. The present invention may also identify other problems that are not caused strictly by intermediate imaging member defects.

The processor compares the printed image with an original image on a pixel by pixel base. The processor determines pixel locations of the printed image and compares pixels of the printed image with pixels of the original image that have same locations as the printed image. The illustrative embodiment employs several methods for determining the pixel locations in the printed image.

The first method adds at least one reference mark to the digitized image data to indicate relative pixel locations of the image. The digital image with the reference mark is printed on a printing substrate, such as a paper sheet, using a selected area of an intermediate imaging member. The printed image is scanned by a scanner and analyzed to find the reference mark. Pixel locations of the printed image are determined relative to the reference mark. The processor compares pixels of the printed image with pixels of the original image at corresponding locations.

The second method generates and prints a test patch of a half-tone image using a selected area of an intermediate imaging member. The printed half-tone image is scanned and fed to a processor. The processor compares the half-tone value of the printed test patch with the half-tone value of the original test patch.

The third method provides a device for checking and adjusting registration and skew of a printing substrate. If there is exact registration and no skew in the printing substrate, the scanned printed image is assumed to have the same pixel locations as the original image.

If the difference between a pixel in a printed image and a corresponding pixel in an original image is greater than a threshold level, the pixel of the printed image is determined to be defective. The processor also counts defective pixel clusters that are greater than a threshold size and determines whether the intermediate imaging member is appropriate for reproducing an image by comparing the number of the defective pixel clusters with a threshold number.

The illustrative embodiment of the present invention determines whether the intermediate imaging member needs to be replaced by comparing the printed image with the original image. The printed image is compared with the original image in a closed loop manner. The closed feedback loop produces a real time analysis of the intermediate imaging member. As a result, the illustrative embodiment saves time to determine whether the intermediate imaging member needs to be replaced and increases accuracy of data for determining the replacement of the intermediate imaging member.

FIG. 1 is an example of a block diagram of an image reproducing apparatus 100. The apparatus 100 includes a first image source 101, a control unit 103, a printing engine 105, a fusing unit 119 and a second scanner 107. The first image source 101 may be, for example, an image scanner, a computer system or a storage device, such as a tape medium. The control unit 103 receives data for an original image from the first image source 101. The control unit 103 generates data for printing the original image in the printing engine 105. The printing engine 105 forms an image on a printing substrate, such as a paper sheet, based on the data generated in the control unit 103.

The printing engine 105 includes an intermediate imaging member 109, an exposure unit 111, a development unit 113, a transfer unit 115 and a cleaning & charging unit 117. Those of skill in the art will appreciate that the printing engine 105 may include the fusing unit 119 even though the fusing unit 119 is depicted outside the printing engine 105 in FIG. 1.

FIG. 2A depicts an example of a print engine 105 using a flexible photoreceptor belt as an intermediate imaging member 109. The print engine 105 prints an image on a printing substrate using a selected imaging area of the belt 109. The belt 109 moves in the direction of arrow 211 passing through process units, such as a charging unit 117, an exposure unit 111, a developing unit 113, a transfer unit 115 and a cleaning unit 117. The belt 109 has a photoconductive surface on which an image is formed with electric charges. A device 213 induces charges over the surface of the belt 109 in the charging unit 117. Electric charges are uniformly spread on the belt 109. The exposure unit 111 forms an image on the selected imaging area of the belt 109. Determining of an imaging area on the belt is described below in more detail. The exposure unit 111 removes the electric charges other than the charges corresponding to the original image by a lay such as a laser beam.

The image formed on the belt 109 passes through developing unit 113 where a plastic powder called toner is introduced to the belt 109 to form a toner image on the belt 109. In developing unit 113, the toner that is charged with opposite polarity to the electric charges on the belt to stick to the charges on the belt 109. The toner image moves to transfer unit 115. At the same time, a printing substrate 215 is supplied to the transfer unit 115 so that the toner image is transferred from the belt 109 to the printing substrate 215. In the transfer unit 115, the toner on the image area of the belt is transferred to the printing substrate by a charged object that draws the toner from the belt 109 to the printing substrate 215.

After transfer, The printing substrate moves in the direction of arrow 217 to fusing unit 119. The fusing unit 119 includes a heated roller 219 adapted to apply heat and pressure to affix the toner image to the printing substrate. The printing substrate 215 with the printed image is sent to the second scanner 107 to obtain data for the printed image. After the toner is transferred from the belt 109 to the printing substrate 215, the cleaning unit 117 removes remaining toner on the belt. The cleaned belt 109 is evenly charged again in the charging unit 117.

Figure 2B:
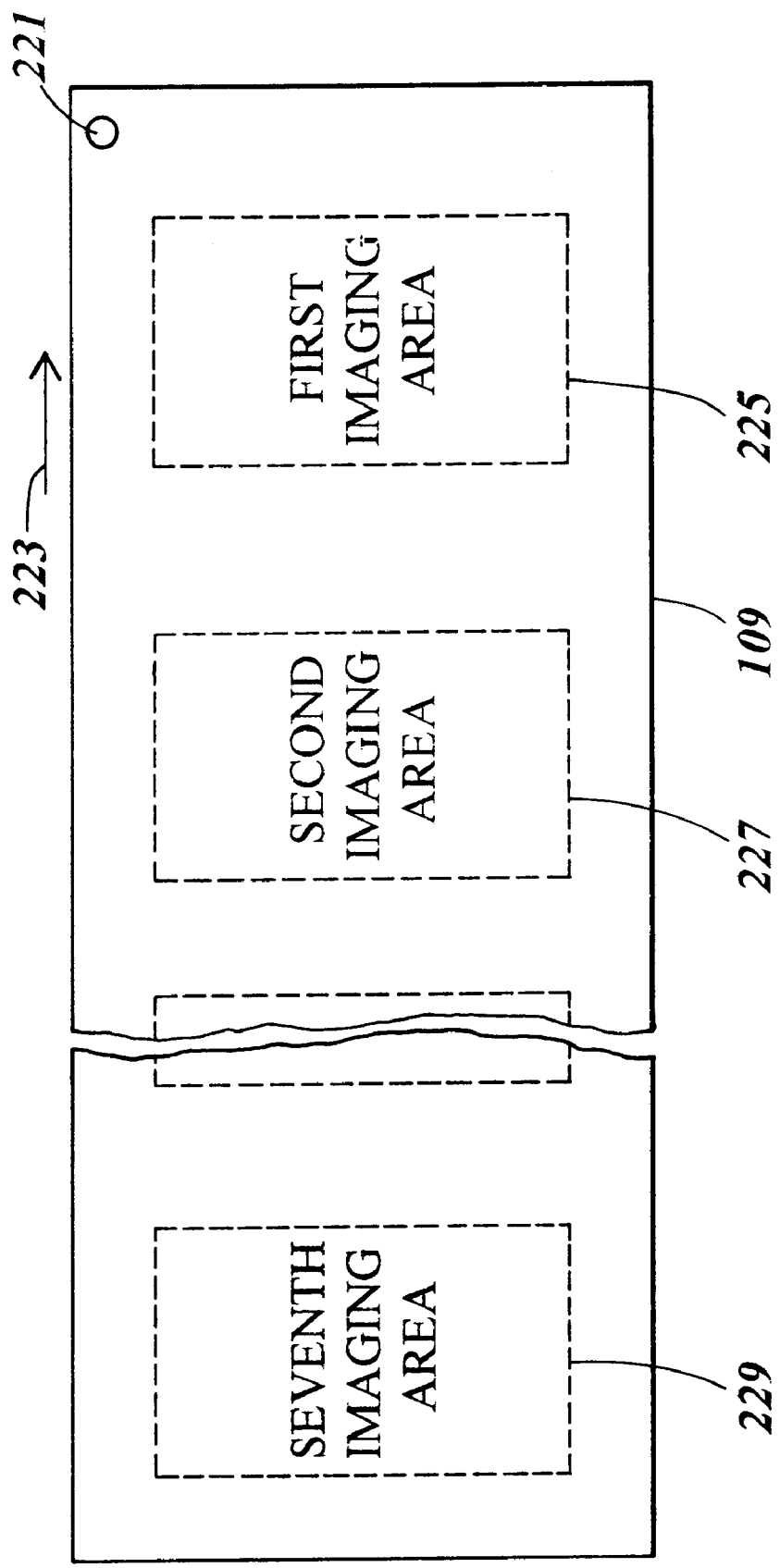
FIG. 2B is an example of flat view of a flexible photoreceptor belt that illustrates determining locations of imaging areas on which an image is formed.

FIG. 2B is an example of a flat view of a photoreceptor belt 109 that illustrates how to determine a location of an imaging area on the belt 109. The belt 109 may include a timing hole 221 to indicate the location of the imaging area. The timing hole 221 may be detected by a detector that can be located below or above the timing hole 221. The belt 109 moves in the direction indicated by arrow 223 during operation of the image reproducing apparatus 100. The location of the imaging area on the belt 109 may be indicated by a horizontal distance from the timing hole 221. Those of skilled in the art will appreciate that other methods may be adopted to indicate the location of the imaging area on the belt. For example, U.S. Pat. No. 5,966,753 describes a seamed flexible electrostatographic imaging belt having a permanent localized solid attribute. The attribute may be detected to indicate a location of an imaging area on the belt.

An imaging area on the belt on which an image is received to transfer the image to a printing substrate is determined based on the size of the printing substrate. Accordingly, the number of imaging areas on the belt 109 depends on the length of the belt 109 and the size of the printing substrate on which the image is printed. For example, the Xerox model 5090™ employs a belt 109 that runs in a seven pitch mode when copying 8.5*11 inch paper. This means that seven sheets of 8.5*11 inch papers can fit on the belt 109 when the belt 109 is laid out flat as shown in FIG. 2B. The first imaging area 225 through the seventh imaging area 229 may be determined on the belt by a horizontal distance from the timing hole 221. The processor 201 may select one of seven imaging areas for printing an image to analyze the imaging area of the belt 109. The imaging area may be selected by a user, such as a technical representative.

The image printed on the printing substrate by using a selected imaging area is scanned by the second scanner 107 to obtain data for the printed image. The second scanner 107 sends the printed image data to the control unit 103. The control unit 103 compares the printed image data with the original image data on a pixel by pixel basis. The control unit 103 detects defective pixels in the printed image based on the comparison. The control unit 103 determines whether the belt 109 needs to be replaced by analyzing the defective pixels of the printed image, such as the number of defective pixel clusters that has a size greater than a threshold size.

Figure 2C:
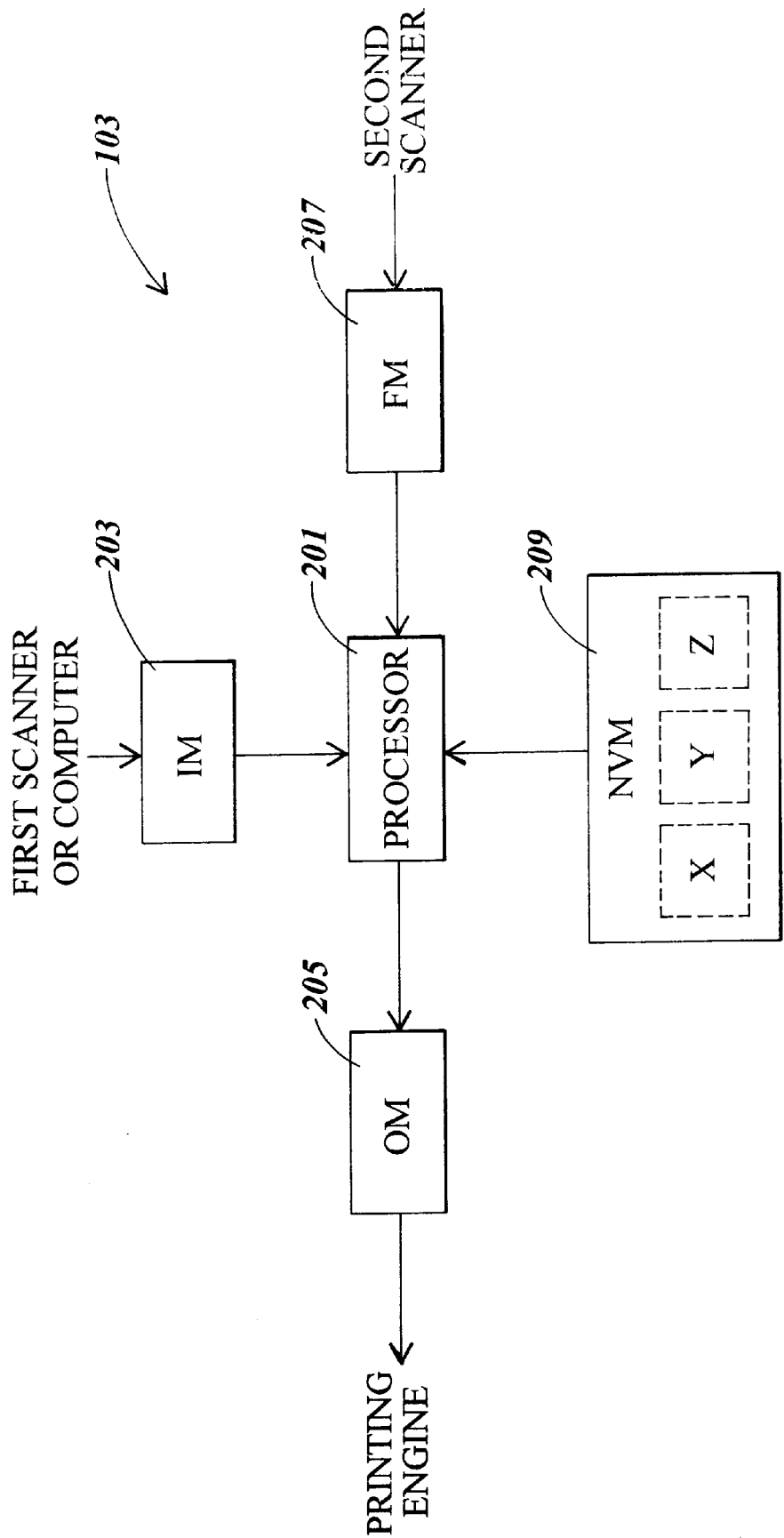
FIG. 2C shows the control unit of FIG. 1 in more detail.

FIG. 2C is an example of a block diagram of a control unit 103 shown in FIG. 1 to illustrate in more detail the structure of the control unit 103. The control unit 103 includes a processor 201, an input memory (IM) element 203, an output memory (OM) element 205, a feedback memory (FM) element 207 and a non-volatile memory (NVM) element 209. Data for the original image is input from a first image source 101 and stored in the input memory element 203. The processor 201 generates data for printing the original image in the printing engine 105 based on the original image data. The generated data is stored in the output memory element 205 and sent to he printing engine 105.

The non-volatile memory element 209 stores a plurality of data for process units in the printing engine 105. In particular, the non-volatile memory element 209 stores a threshold level (x) of the difference between the original image data and the printed image data for determining whether a pixel of printed image is defective. The non-volatile memory element 209 may also store a threshold size (y) of the defective pixel cluster that is taken into account to determine whether the belt 109 needs to be replaced. The non-volatile memory element 209 may further store a threshold number (z) of defective pixel clusters in the printed image to determine whether the belt is out of its lifetime. Those values stored in the non-volatile memory element 209 may be input by a manufacturer in the manufacturing stage or technical representatives in the field.

Printed image data is input from a second scanner 107 and stored in the feedback memory element 207. The processor 201 compares the original image and the printed image pixel by pixel at a same location. Methods for determining pixel locations of the printed image are described below in more detail. If the resolution of the original image data is equal to that of the printed image data, the data in the input memory element 201 may directly be compared with the data in the input memory element 203. If the resolutions are different, either the data in the feedback memory element 207 or the data in the input memory element 203 may be interpolated to generate data with same resolution as the other data.

In addition, if the original image is reproduced by a same size, the data in the input memory element 201 may directly be compared with the data in the input memory element 203. If the original image is enlarged to a larger size or reduced to a smaller size, the data in the feedback memory element 207 may be processed so that the printed image has a same size as the original image. Those of skill in the are will appreciate that the techniques for enlarging or reducing the original image data may be adopted to reduce or enlarge the printed image data.

The processor 201 calculates a difference in values, such as chrominance, luminance or intensity, between the original image and the printed image for each pixel. The processor 201 compares the difference with a threshold value (x) stored in the non-volatile memory element 209 to determine whether the pixel is defective. After examining all pixels in the printed image, the processor 201 may select defective pixel clusters whose size is greater than the threshold size (y) and then count the number of the defective pixel clusters that are greater than the threshold size (y). The processor 201 may compare the counted number with a threshold number (z) stored in the non-volatile memory element 209 to determine whether the selected imaging area of the belt 109 is appropriate for reproducing an image.

Where the processor 201 determines that the selected imaging area of the belt is not appropriate for reproducing an image, the processor 201 not only notifies the user that the belt needs to be replaced but the processor also controls the image reproducing apparatus 100 in a degraded mode. In the degraded mode, the apparatus is controlled to stop imaging on the defective area and skip to next imaging area that is not defective. If the first imaging area 225 is determined to be defective, the first imaging area is prohibited to receive an image. The image is received on a next non-defective imaging area, such as the second imaging area 227. As a result, if the belt 109 that runs in a seven pitch mode has a defective imaging area, the belt may run in a degraded six or less pitch mode.

Figure 3:
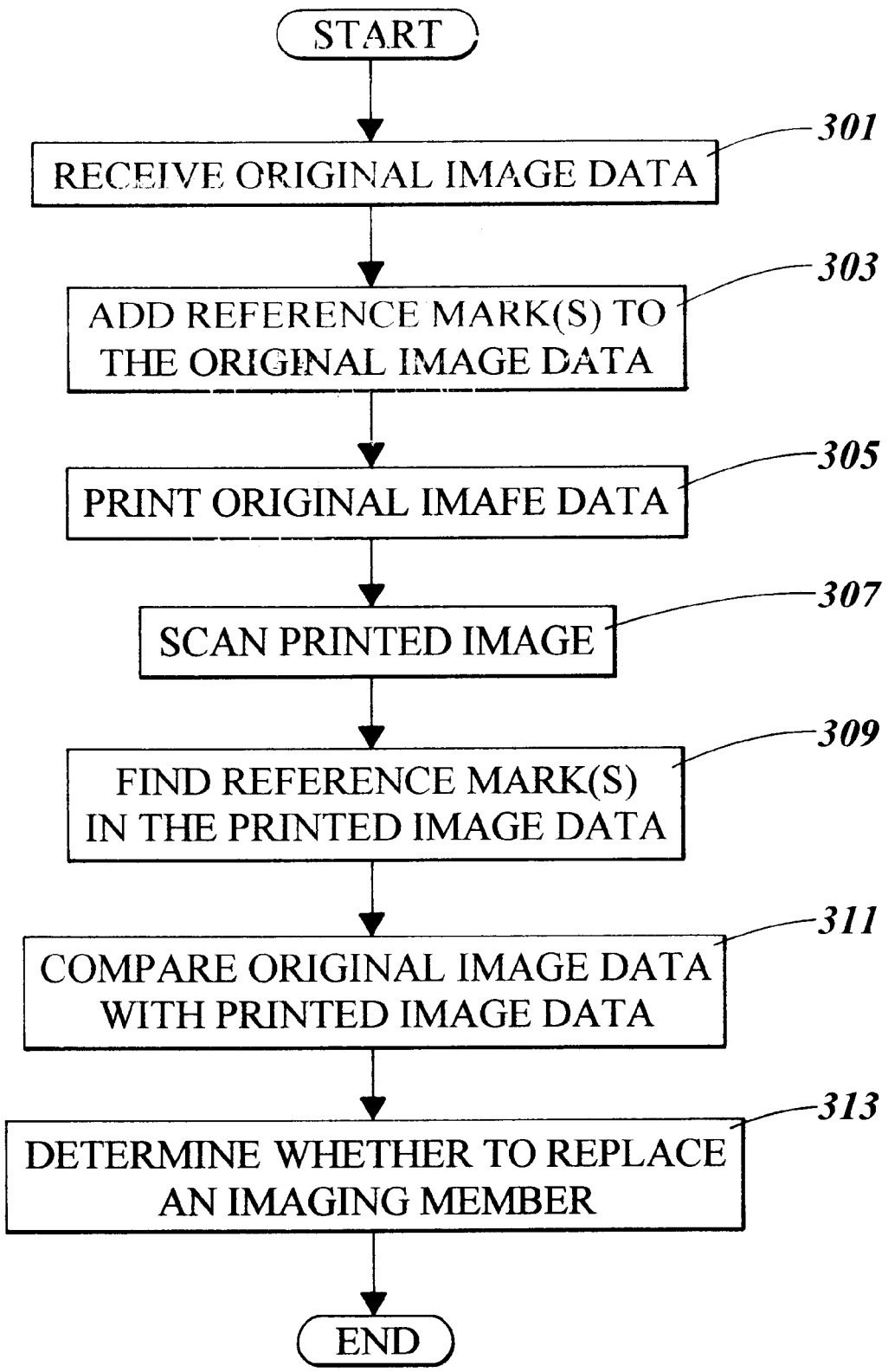
FIG. 3 is a flowchart illustrating the steps that are performed to compare a printed image with an original image by adding reference marks to the original image data in the illustrative embodiment.

FIG. 3 is a flowchart that illustrates steps performed to compare a printed image with an original image by using a first method for determining pixel locations of a printed image. The processor 201 receives original image data for printing an original image in an image reproducing apparatus 100 (step 301). The original image data is input from a first image source 101. The original image data may originate from an image scanner or a computer system, for example. The processor 201 adds one or more reference marks to the original image data to indicate relative locations of pixels from the reference marks in the original image data (step 303).

Figure 4:
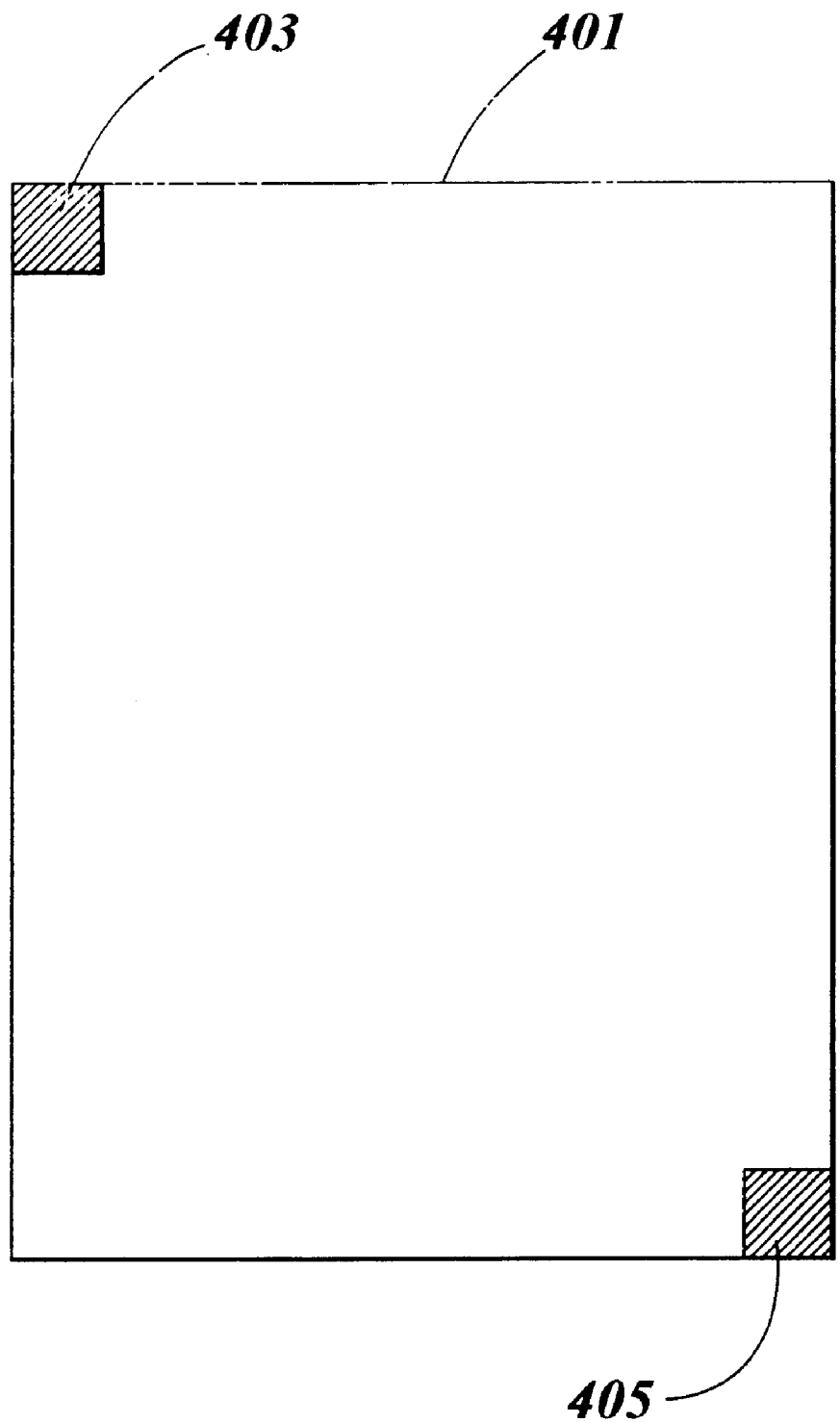
FIG. 4 shows an example where reference marks are added to an original image to indicate relative pixel locations of the original image.

FIG. 4 shows an example where reference marks have been added to the original image data. As shown in FIG. 4, the reference marks are added to left upper and right lower comers 403 and 405 of the original image 401. Those of skill in the art will appreciate that the reference mark may be added to other location of the original image, for example, centers of left edge side and right edge side.

The processor 201 outputs to the printing engine 105 data for printing the original image. The printing engine 105 prints on a printing substrate the original image with the reference marks by using a selected imaging area of the belt 109 (step 305). The printed image is scanned by a second scanner 107 and the printed image data is fed back to the processor 201 (step 307). The processor 201 finds reference marks in the printed image data (step 309) and determines locations of pixels in the printed image data. The pixel locations of the original image data are determined relative to the reference marks. The processor 201 compares the printed image and the original image at a same location relative to the reference marks (step 311). The processor 201 compares the difference between the original image and the printed image with a threshold value (x) stored in the non-volatile memory element to determine whether pixels of the printed image are defective. The processor 201 determines whether the selected imaging area on the belt 109 is appropriate for reproducing an image on the basis of the defective pixels as described above with reference to FIG. 2C (step 313).

Figure 5:
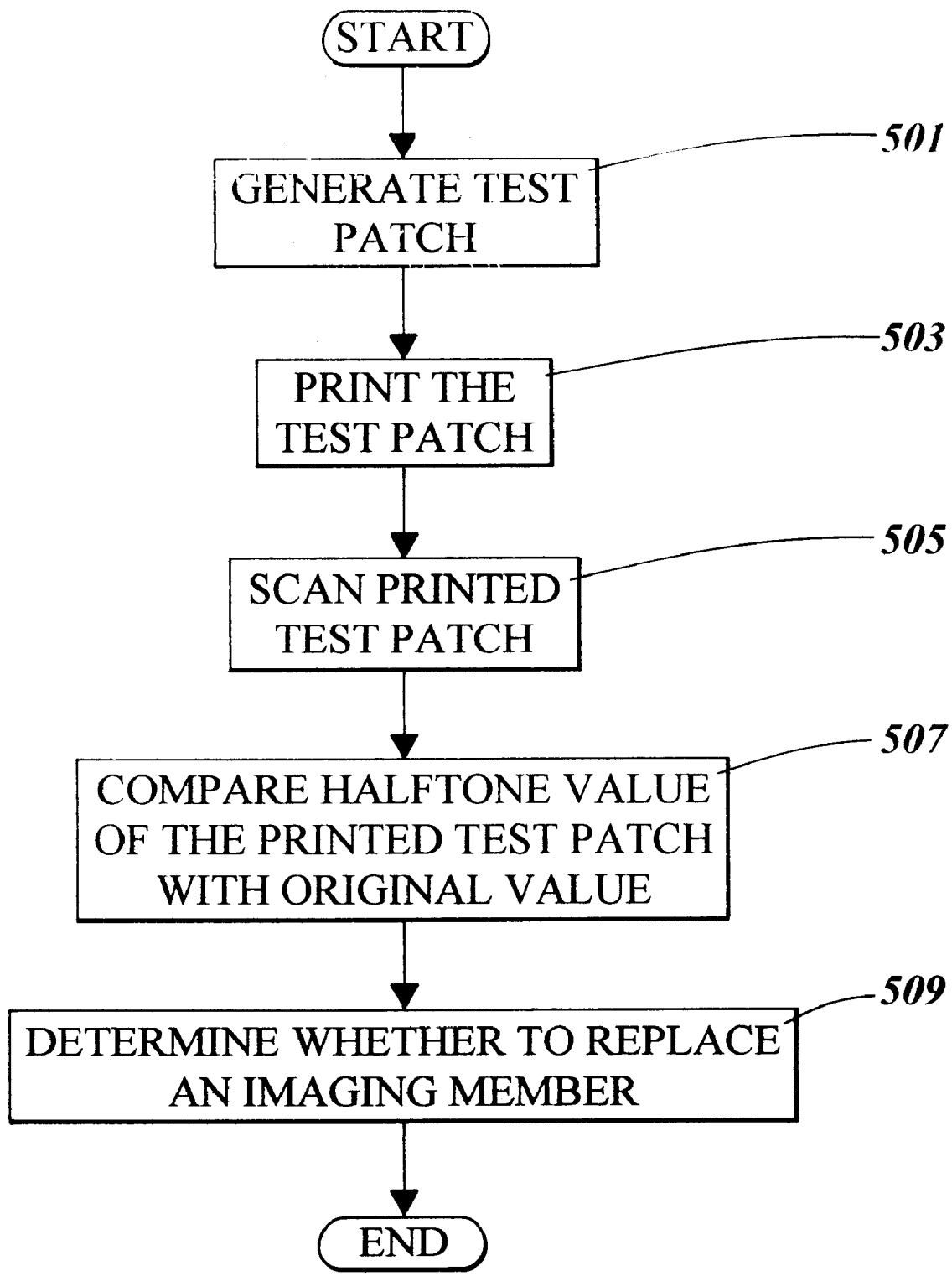
FIG. 5 is a flowchart illustrating the steps that are performed to compare a printed image with an original image by printing a half-tone test patch in the illustrative embodiment.

FIG. 5 is a flowchart that illustrates another method for comparing the printed image with the original image. The processor 201 generates a test patch to print in a printer or copier (step 501). The processor 201 outputs to the printing engine 105 the data for the test patch. The printing engine 105 prints the half-tone test patch on a printing substrate by using a selected imaging area of the belt 109 (step 503). The printed test patch is scanned by a second scanner 107 to obtain data for the printed half-tone test patch (step 505).

The processor 201 determines a half-tone value for each pixel of the printed half-tone test patch. The processor 201 calculates the difference in values in the printed half-tone test patch and the original half-tone test patch (step 507). The processor 201 compares each calculated difference with a threshold value (x) stored in the non-volatile memory element 209 to determine whether each pixel of the printed half-tone test patch is defective. The processor 201 determines whether the belt 109 needs to be replaced as described above with reference to FIG. 2C (step 509).

Figure 6:
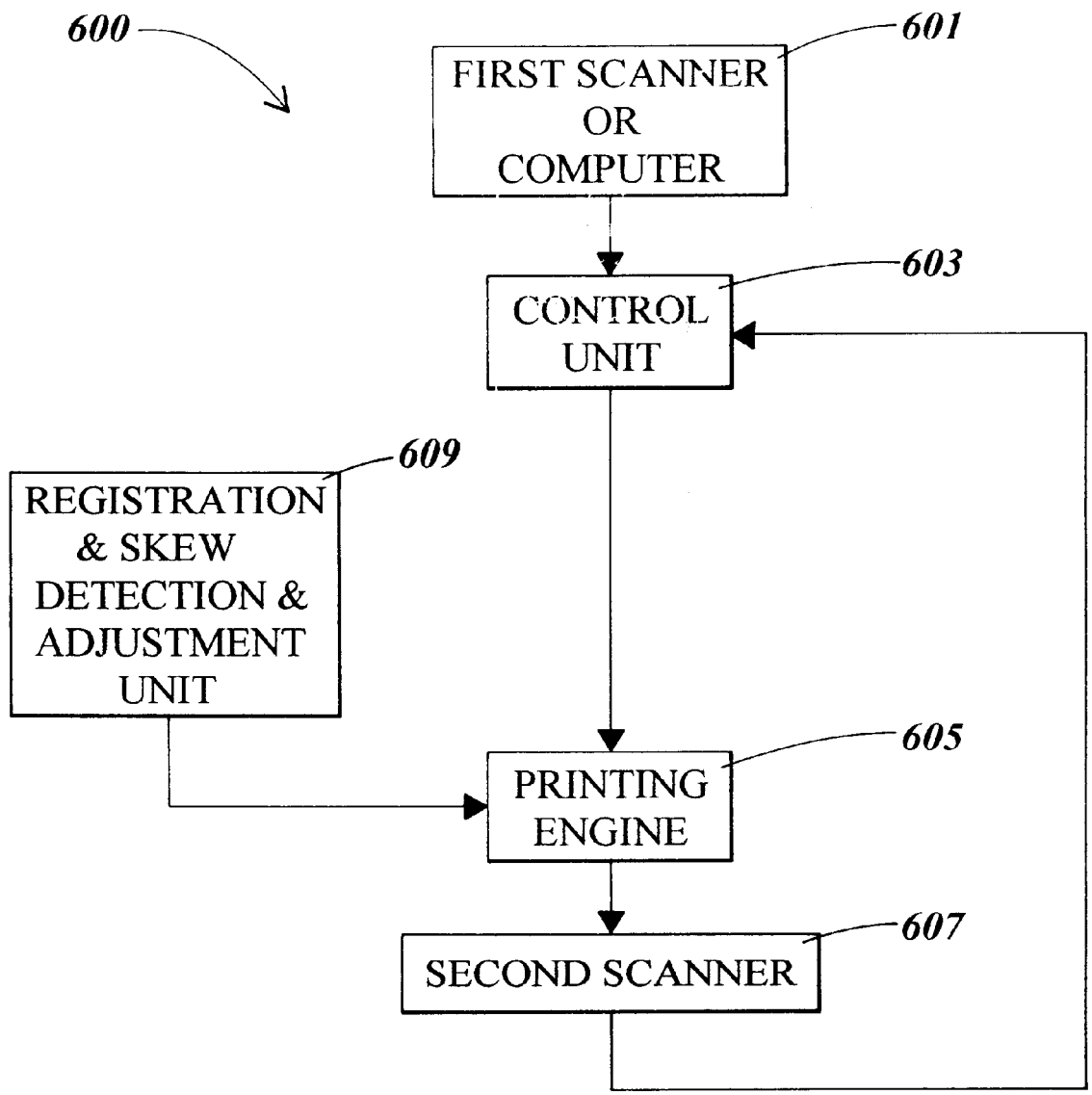
FIG. 6 is an example of a block diagram of an image reproducing apparatus that employs a unit for detecting and adjusting registration and skew of a printing substrate to ensure that an original image is printed in an exacting fashion on the printing substrate.

FIG. 6 is another example of a block diagram of an image reproducing apparatus for comparing a printed image with an original image by using a third method for determining pixel locations of a printed image. The system 600 includes a first image source 601, control unit 603, a printing engine 605, a second scanner 607 and a registration and skew detection and adjustment unit 609. The control unit 603 receives data for an original image from the first image source 601. The control unit 603 generates data for printing the original image in the printing engine 605. The printing engine 605 prints an image on a printing substrate based on the data generated in the control unit 603.

The system 600 additionally includes a registration and skew detection and adjustment unit 609. A number of devices are developed for detecting and adjusting registration and skew in a printing substrate. For example, U.S. Pat. No. 6,059,284 to Wolf et al. describes an apparatus and method for registering and deskewing a sheet along a sheet path. The registration and skew detection and adjustment unit 609 allows ensuring a perfect registration and no skew of the printed image on the printing substrate.

The printed image on the printing substrate is scanned by a second scanner 107 to obtain data for the printed image. The second scanner 107 sends the printed image data to the processor 201. The processor 201 compares the printed image data with original image data on a pixel by pixel basis. The location of the pixels in the printed image data is assumed to be the same as the location of pixels in original image data due to the registration and skew detection and adjustment unit 609. The operation of the processor is described below in more detail.

Figure 7:
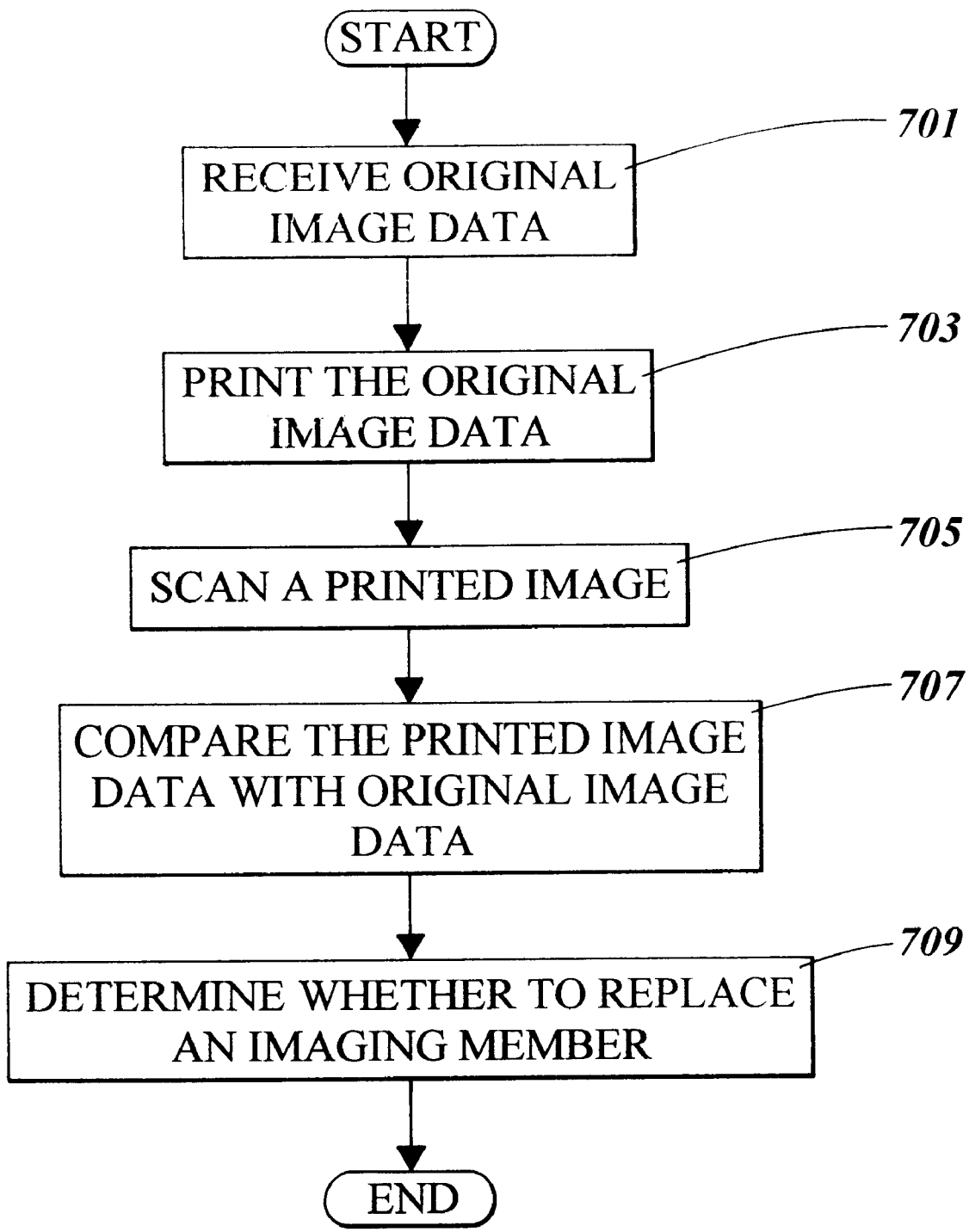
FIG. 7 is a flowchart illustrating the steps that are performed to compare a printed image with an original image by utilizing a unit for detecting and adjusting registration and skew of a printing substrate.

FIG. 7 is a flowchart that illustrates steps performed to compare a printed image with an original image by employing a registration and skew detection and adjustment unit 609 shown in FIG. 6. The processor 201 receives data for an original image from a first image source 101 (step 701). The processor 201 generates data for printing the original image in the printing engine 105 and prints the image on a printing substrate by using a selected imaging area of the belt 109 (step 703).

In the printing process, the registration and skew detection and adjustment unit 609 examines registration and skew of the printed image. The registration and skew detection and adjustment unit 609 adjusts the detected skew in the printing substrate. Thus, the registration and skew detection and adjustment unit 609 helps to ensure better registration and minimal skew of the printing substrate. The printed image is scanned to obtain printed image data in the second scanner 107 (step 705).

The processor 201 compares a pixel of the original image data with a pixel of the printed image at the same locations (step 707). Pixel locations of the printed image data are assumed to be the same as pixel locations of the original image data due to the registration and skew detection and adjustment unit 609. The processor 201 calculates a difference between the original image data and the printed image data for each pixel. The processor 201 compares the difference of a pixel with a threshold value stored in the non-volatile memory element 209 to determine whether the pixel of the printed image is defective. The processor 201 determines whether the selected imaging area on the belt 109 is appropriate for reproducing an image as described above with reference to FIG. 2C (step 709).

Figure 8:
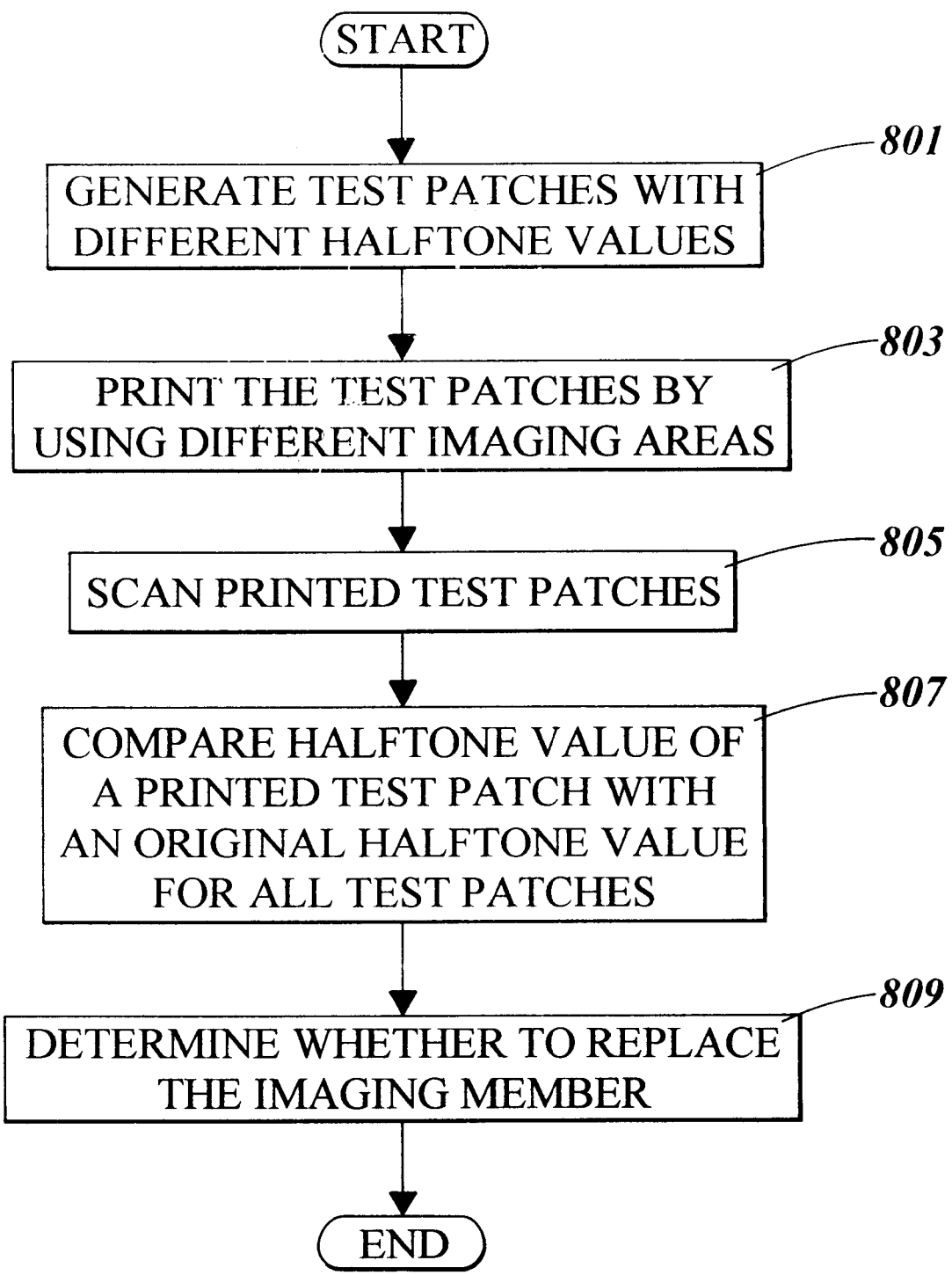
FIG. 8 is a flowchart illustrating the steps that are performed to analyze all imaging areas of an intermediate imaging member in the illustrative embodiment of the present invention

FIG. 8 is a flowchart that illustrates steps performed to analyze all imaging areas of the belt 109 concurrently in the illustrative embodiment. For this purpose, the processor 201 produces half-tone test patches to print in the image reproducing apparatus 100 (step 801). The number of the test patches is determined based on the length of the belt 109. In a system that runs in a seven pitch mode as illustrated with reference to FIG. 2B, seven half-tone test patches may be generated that have a size of 8.5*11 inches. The half-tone test patches have a different half-tone value than other test patches to distinguish from each other. Even though the illustrative embodiment employs half-tone test patches, those of skill in the art will appreciate that other type of test patches may be employed to distinguish one test patch from other test patches. Those of skill in the art will also appreciate that other method illustrated with reference to FIGS. 3 and 7 may be employed to the concurrent analysis of all imaging areas in the belt 109 instead of the test patch method now illustrated here.

The test patches are printed on the printing substrates using different imaging areas of the belt 109 (step 803). For example, seven test patches with different half-tone values are consecutively printed using a first imaging area 225 through a seventh imaging area 229, respectively (shown in FIG. 2B). The printed test patches are scanned to obtain half-tone values of pixels in the printed test patches (step 805). The processor 201 compares the half-tone values of pixels in printed half-tone test patches with original half-tone values of the half-tone test patches (step 807).

The processor 201 compares the differences with a threshold value (x) stored in the non-volatile memory element 209 to determine whether pixels of printed test patches are defective. The processor 201 counts in each imaging area the number of defective pixel clusters that are greater than a threshold value (y). If the counted number of the defective pixel clusters in an imaging area is greater than a threshold number (z), the processor 201 determines that the imaging area is past its effective lifetime. This analysis is iterated for all imaging area to determine imaging areas that are not appropriate for reproducing an image (step 809). If the processor 201 find two defective imaging areas, the system is controlled in a degraded mode, such as a five pitch mode if the system operates normally in a seven pitch mode. The processor 201 also notifies the user that the belt needs to be replaced.

It is, therefore, apparent that there has been provided, in accordance with the present invention, a method and apparatus for analysis of an intermediate imaging member. While this invention has been described in conjunction with illustrative embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. In an image reproducing apparatus, a method for detecting defects of an intermediate imaging member to analyze the intermediate imaging member, said intermediate imaging member receiving an image to transfer the image to a printing substrate, said method comprising the steps of:

(a) providing a half-tone test patches to print in the image reproducing apparatus, each said half-tone test patch having an original half-tone value and each said half-tone test patch having a different half-tone value than other test patches for print the image;

(b) printing the half-tone test patches on the printing substrates, said half-tone image test patches with the different half-tone values are printed consecutively using all area of the intermediate imaging member, each of the half-tone value is using each area of the intermediate imaging member;

(c) scanning the half-tone test patches to obtain half-tone values for the printed half-tone test patches;

(d) comparing the half-tone values of the printed half-tone test patches with the original half-tone values; and (e) detecting defects in each area of the intermediate imaging member based on the comparison to determine whether the intermediate imaging member is appropriate for reproducing an image.

2. The method of claim 1 further comprising the step of operating the image reproducing apparatus in a degraded mode when the intermediate imaging member is determined that at least one area of the intermediate imaging member is determined to not be appropriate for reproducing an image.

3. The method of claim 1 wherein said area of the intermediate imaging member is determined based on sizes of the half-tone test patches and the printing substrates on which the test patches are printed.

4. The method of claim 1 wherein said comparing step comprises the steps of:

calculating the half-tone values of the printed half-tone test patches and the original half-tone values of the test patches; and comparing the difference for each pixel with a threshold level to determine whether the pixel is defective.

5. The method of claim 4 further comprising the step of inputting a threshold level of the difference for determining whether a pixel of the printed half-tone image is defective.

6. The method of claim 4 further comprising the steps of:

counting the number of defective pixel clusters in the predetermined area of the intermediate imaging member that has a size greater than a threshold size; and where the number of defective pixel clusters is greater than a threshold number, determining that the predetermined area of the intermediate imaging member is defective.

7. The method of claim 6 further comprising the step of inputting a threshold size and number of the defective pixel cluster for determining whether the predetermined area of the intermediate imaging member is defective.

8. A system for analyzing an image reproducing apparatus, an intermediate imaging member receiving an image to transfer the image to a printing substrate, said apparatus comprising:

(a) a processor for generating a plurality data for half-tone image test patches, each half-tone test patch having different half-tone value than other test patches for print the images;

(b) a printing engine for printing the image on a printing substrate, said printing engine including said intermediate imaging member for receiving the image on a predetermined area to transfer the image to the printing substrate;

(c) a scanner for scanning the image printed on the printing substrate to obtain an output image data; and (d) wherein said processor compares the test image data with the output image data, detects defective pixels of the printed image.

9. The system of claim 8 wherein the processor determines whether the predetermined area of the intermediate imaging member is defective by the comparing of the second image data with the first image data.

10. The system of claim 9 wherein said processor controls the image reproducing apparatus in a degraded mode where the predetermined area of the intermediate imaging member is determined to be defective.

11. The system of claim 8 wherein said printing engine includes means for determining a location of an area in the intermediate imaging member on which the image is received.

12. The system of claim 8 wherein said half-tone image test patches with different half-tone values are printed consecutively using all area of the intermediate imaging member.

13. The system of claim 8 further comprising a memory device for storing a threshold value of a difference of a pixel between the first image and the second image for determining whether the pixel of the printed image falls into a defect.

14. The system of claim 8 wherein said processor adds at least one reference mark to the first image data to indicate relative pixel locations of the first image data from the one or more reference marks.

15. The system of claim 14 wherein said processor adds the reference mark to one of corners in the image.

16. The system of claim 8 wherein said processor includes:
   means for comparing the first image data with the second image data for a pixel of a same location;
   means for comparing a difference between the first image and the second image for each pixel with a threshold level; and
   means for determining whether each pixel of the printed image is defective.

17. The system of claim 8 wherein said processor includes:
   means for counting the number of defective pixel clusters that have a size greater than a threshold sizes; and
   means for comparing the number of defective pixel clusters with a threshold number to determine whether the area of the intermediate imaging member is appropriate for reproducing an image or not.

* * * * *